United States Patent [19]
Egashira et al.

[11] Patent Number: 5,567,068
[45] Date of Patent: Oct. 22, 1996

[54] MULTIFUNCTION PRINTER

[75] Inventors: Yasuo Egashira, Saga; Isao Yamasaki, Kurume, both of Japan

[73] Assignee: Matsushita Electric Industrial Co., Ltd., Osaka, Japan

[21] Appl. No.: 495,108

[22] Filed: Jun. 27, 1995

[30] Foreign Application Priority Data

Jun. 30, 1994 [JP] Japan .................................... 6-149194

[51] Int. Cl.$^6$ ....................................... B41J 11/58
[52] U.S. Cl. ..................... 400/625; 400/642; 400/693; 400/691; 271/9.01; 271/278; 361/724; 358/300; 347/3
[58] Field of Search .................................... 400/625, 595, 400/605, 642, 690, 691, 692, 693; 347/3, 4, 108, 135; 355/308, 313, 316; 358/296, 300

[56] References Cited

U.S. PATENT DOCUMENTS

| | | | |
|---|---|---|---|
| 4,662,765 | 5/1987 | Kapp et al. | 400/595 |
| 4,893,137 | 1/1990 | Ebinuma et al. | 347/3 |
| 5,073,055 | 12/1991 | Takagi et al. | 400/692 |
| 5,101,236 | 3/1992 | Nelson et al. | 347/135 |
| 5,106,212 | 4/1992 | Endo et al. | 400/56 |
| 5,213,427 | 5/1993 | Grosse et al. | 400/625 |
| 5,302,037 | 4/1994 | Schoendienst et al. | 400/693 |
| 5,329,373 | 7/1994 | Hayashi et al. | 347/3 |
| 5,359,435 | 10/1994 | Hayashi et al. | 358/296 |
| 5,364,195 | 11/1994 | Kanemitsu et al. | 374/4 |

*Primary Examiner*—Eugene H. Eickholt
*Attorney, Agent, or Firm*—Watson Cole Stevens Davis, P.L.L.C.

[57] ABSTRACT

A multifunction printer having scanning and printing functions includes: a first cover located at one side surface of the deice body of the printer; a second cover located in the device body, inside of the first cover; a first paper transfer path connected to an image reading unit having the scanning function, the first paper transfer path being defined between the first and second covers; a second paper transfer path connected to a printing unit, the second paper transfer path defined in the device body inside of the second cover; and diverging means for selectively diverging the paper into one of the first and second paper transfer paths. Whereby, if jamming occurs in the first paper transfer path, jamming paper can be easily removed by opening the first cover, whereas if jamming occurs in the second paper transfer path, jamming paper can be easily removed by opening the second cover after opening the first cover.

3 Claims, 5 Drawing Sheets

MULTIFUNCTION PRINTER

BACKGROUND OF THE INVENTION

1. Field of the Invention

The present invention relates to a multifunction printer capable of printing, scanning, copying, facsimile communication, etc.

2. Description of the Related Art

In recent years, great advancements have been made in office automation technology, and various types of equipment such as a printer serving as computer peripheral equipment, a copying machine, or a facsimile machine serving as communication means are now widely used. Inter alia, multifunction printer incorporating a plurality of functions owned by the office automation equipment has been developed. The multifunction printer is especially effective for use in a small office since it has only a small installation space, and thus; the multifunction printer has become popular in small offices. There are several kinds of multifunction printers in which these functions are variously combined.

Explanation will be hereinbelow made of an example of a conventional copying machine. FIGS. 4 and 5 illustrate the internal structure of the conventional copying machine. In FIGS. 4 and 5, there are shown a document tray 1 on which an original document to be copied is set. An image of the document is formed via a lens array 2 onto a photoconductive drum 3. In regions surrounding the photoconductive drum 3, there are a developing unit 4, a transferring charger 5, a cleaner 6, and a charger 7 which are arranged in the mentioned-order in the direction of rotation of the photoconductive drum 3, starting with the developing unit 4 located next to an exposure position corresponding to the lens array 2. An electrostatic latent image is formed on the surface of the photoconductive drum 3 at the exposure position, and is then developed by the developing unit 4. Copying paper is fed via a paper feeding path 8 to an image transferring part 9 between the photoconductive drum 3 and the transferring charger 5, and the image is transferred onto the copying paper by the transferring charger 5. The remaining toner is then removed by the cleaner 6, and the outer surface of the photoconductive drum 3 is uniformly charged by the charger 7 so that another latent image may be formed by means of exposure.

Reference numeral 10 denotes a paper feeder 10. Copying paper is fed sheet by sheet to a timing roller 11 via a feeding roller 10a of the paper feeder 10. The timing roller 11 rotates in synchronization with the photoconductive drum 3 so as to send the copying paper to the image transferring part 9 in such a manner that the leading end of the copying paper is aligned with that of the area of the image formed on the photoconductive drum 3. An upper guide 12 and a lower guide 13 are located between the timing roller 11 and the image transferring part 9 so that the copying paper fed by the timing roller 11 is guided to the image transferring part 9. After the image has been transferred onto the copying paper at the image transferring part 9, the copying paper is sent by a paper transferring belt 14 to a fixing part 15 at which the image is fixed by means of heat and pressure. The copying paper is then discharged to the outside of the copying machine.

As shown in FIG. 5, the body of this copying machine is divided into upper and lower body parts 16 and 17 wherein the upper body part 16 includes the photoconductive drum 3, the developing unit 4, and the cleaner 6, and the lower body part 17 includes the timing roller 11, the upper and lower guides 12 and 13, the transferring charger 5, the paper transferring belt 14, and the fixing part 15. The upper body part 16 is supported in such a manner as to be turned around at its one side end as a fulcrum so that the paper feeding path 8 is opened thereby allowing a user to remove jamming paper.

Conventional multifunction printers have a paper transferring mechanism mainly including two paper transferring systems for a printer section and for a scanner section. An outlet is separately formed in each paper transferring system so that when the paper transfer path is jammed with paper the paper may be removed via the outlet. In this case, the jamming paper is sent to the corresponding outlet via auxiliary rollers, and is removed by a human hand.

However, the conventional multifunction printer has a problem that the openings are located separately in respective paper transferring systems, resulting in an increase in the size of the printer. In the copying machine as mentioned above, it has a simpler structure including only one paper transfer path and it is possible to easily remove jamming paper by raising or opening the upper body part 16. In contrast, even though a multifunction printer having a plurality of functions and thus having a plurality of paper transfer paths would be implemented in a similar manner to the copying machine described above so that the structure thereof would allow a user to remove jamming paper from one of transfer paths by rasing the upper body part, it still remains a problem how to remove jamming paper from the other of the transfer paths.

It is an object of the present invention to provide a multifunction printer which can have a smaller size and be installed in a small space and which is capable of easily dealing with jamming for any of a plurality of paper transfer paths incorporated therein.

SUMMARY OF THE INVENTION

To achieve the above-mentioned object, the present invention provides a multifunction printer including: a body having an outer surface, a first cover provided at the outer surface of the body so as to be opened and closed as required; a second cover provided in the body, inside of the first cover so as to be opened and closed as required; a first paper transfer path formed between the first and second covers so as to be exposed to the outside when the first cover is opened; a second paper transfer path formed in a space inside of the first paper transfer path so as to be exposed to the outside when the second cover is opened after opening the first cover; a paper feeding part; and diverging means for selectively diverging paper fed from said paper feeding part, into one of said first and second paper transfer paths; functional units including at least printing means and image reading means and provided in the first and second paper transfer paths, respectively.

In the thus formed multifunction printer, if the first cover is opened, the first paper transfer path is exposed to the outside, and if the second cover is opened after opening the first cover, the second paper transfer path is exposed to the outside. As a result, jamming paper can be easily removed by opening the covers in the same direction even though jamming occurs in either the first paper transfer path or the second paper transfer path.

DESCRIPTION OF THE PREFERRED EMBODIMENT

Figure 1:
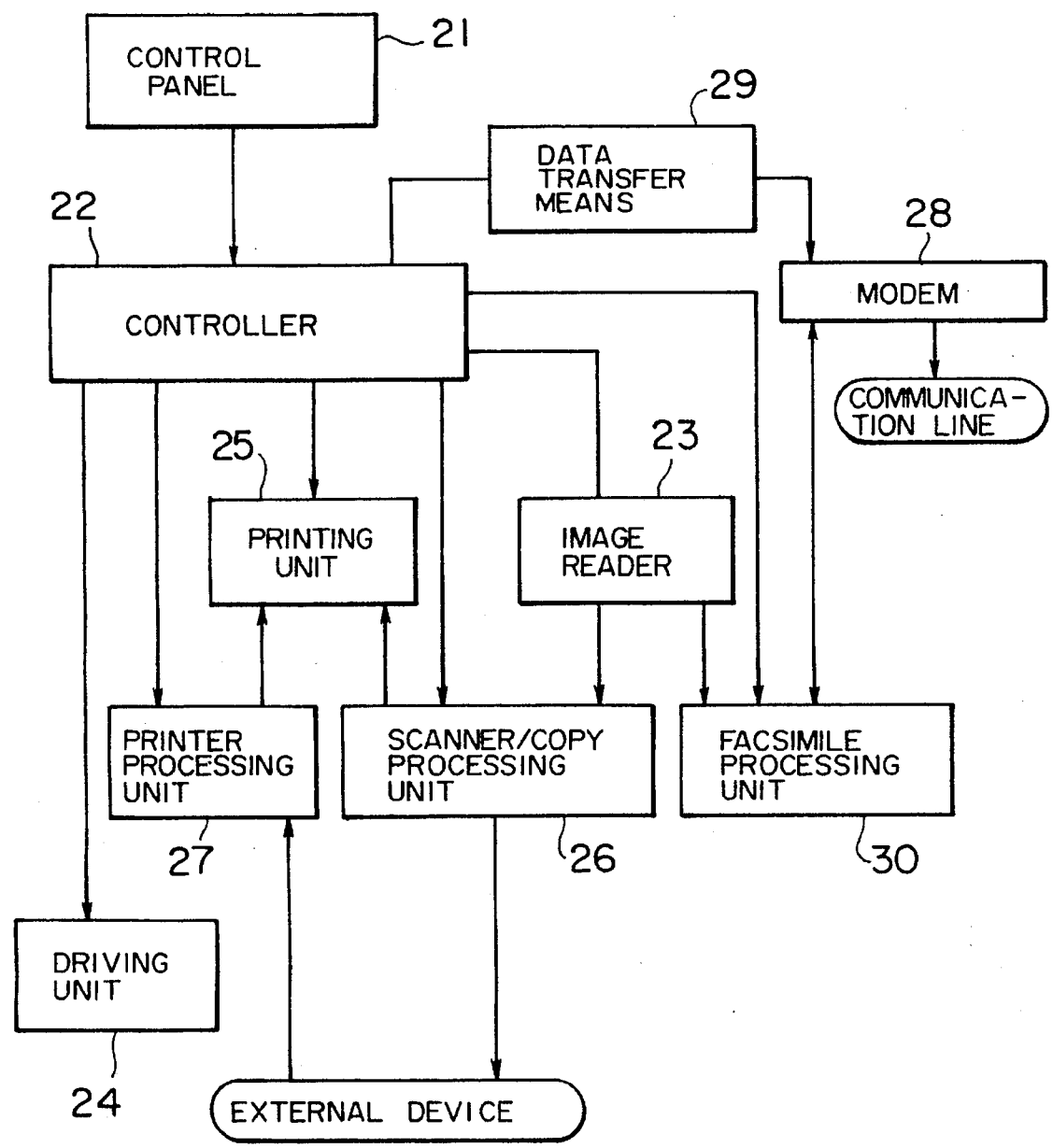
FIG. 1 is a view illustrating a functional block diagram illustrating a multifunction printer in one embodiment of the present invention.

Referring to the accompanying drawings, a preferred embodiment of a multifunction printer according to the present invention will be described below. FIG. 1 is a block diagram which shows a multifunction printer in one embodiment of the present invention. This multifunction printer includes: a control panel 21 having various control keys such as a scanner mode selection key, a copy mode selection key, a printer mode selection key, a data transfer mode selection key, and a facsimile mode selection key; a controller 22 that, when one of the selection keys provided on the control panel 21 is pressed, outputs a control signal corresponding to the selected key, and also outputs a control signal for dealing with data received via a network control apparatus (not shown) connected to a communication line; an image reader 23 that reads data line by line and outputs the thus obtained data; a driving unit 24 for driving a paper transfer system; a printing section 25 for printing input data onto paper; a scanner/copy processing unit 26 that corrects the data obtained via the image reader 23 and outputs the resultant data to an external device (such as a computer) in response to a control signal which is delivered from the controller 22 when the scanner mode is selected, and that corrects data obtained via the image reader 23 and outputs the resultant data to the printing section 25 in response to a control signal which is delivered from the controller 22 when the copy mode is selected; a printer processing unit 27 that converts data received from an external device into font data including characters and outputs the resultant data to the printing section 25 in response to a control signal which is delivered from the controller 22 when the printer mode is selected; data transferring means 29 that, when the printer mode is selected, transfers data received from an external device to the communication line via a modem 28, and also transfers data received from the communication line to the external device via the modem 28; and a facsimile processing unit 30 that, in the case where the facsimile mode is selected, binarizes and compresses data which is received line by line via the image reader 23, and transmits the resultant data to the communication line via the modem 28, and also expands data which is received from the communication line via the modem 28, and outputs the resultant data line by line to the printing section 25 in response to a control signal delivered from the controller 22.

Figure 2A:
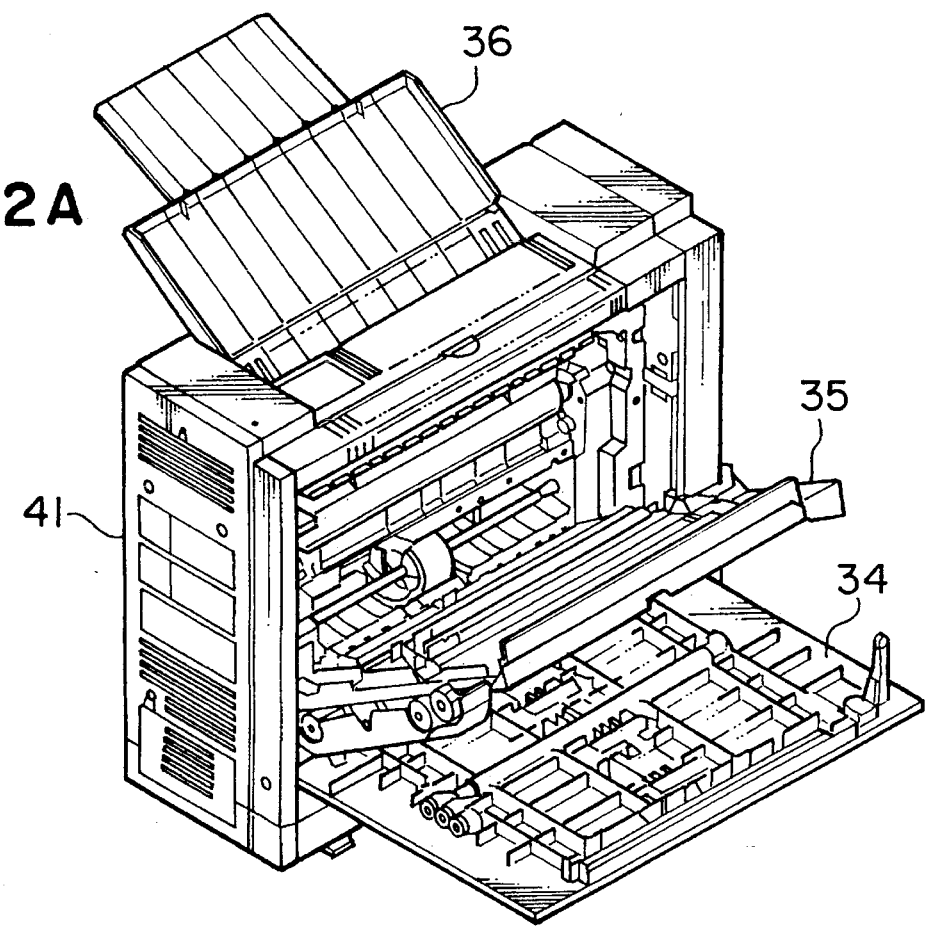
FIG. 2a is a perspective view illustrating the multifunction printer shown in FIG. 1, as viewed on one side.
Figure 2B:
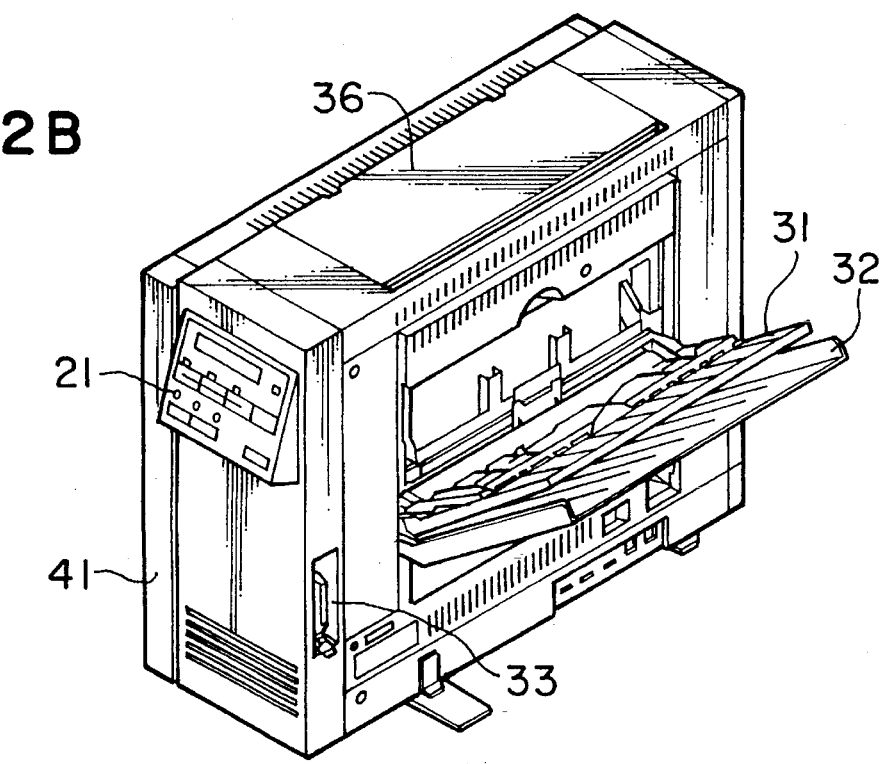
FIG. 2b is a perspective view illustrating the multifunction printer shown in FIG. 1, as viewed on the other side.

FIGS. 2a and 2b are perspective views which show the multifunction printer in the embodiment of the invention. Whereas the device body 41 is of a vertical type in the example described here, the device body may also be of a horizontal type without any hindrance.

As shown in FIG. 2b, the control panel 21 is located in the upper part of the front panel of the device body 41, and a first paper tray 31 carries thereon on a document to be copied or to be transmitted by means of facsimile communication is placed. A second paper tray 32 carries thereon paper which is adapted to be transferred to the printing section 25 for printing thereon. The first and second paper trays 31 and 32 are attached to one side surface of the device body in such a manner that they can be opened and closed as required. An interface 33 receives and transmits input and output data therethrough from and to an external device. FIG. 2a is a view which shows the multifunction printer shown in FIG. 2b as viewed from the side opposite to the side as viewed in FIG. 2a. A first cover 34 is located on the side of the device body 41, remote form the paper trays, in such a manner that it can be opened and closed as required. When the first cover 34 is opened, a first paper transfer path (described later) is exposed to the outside and thus it is possible to remove jamming paper from the first paper transfer path if it exists. A second cover 35 is located in the device body 41, inside of the first cover 34 in such a manner that it can be opened and closed as required. If the second cover 25 is opened after opening of the first cover 34, a second paper transfer path (described later) is exposed to the outside and thus it is possible to remove jamming paper from the second paper transfer path it exists.

A paper discharge tray 36 receives thereonto paper which is led out from the first or the second paper trays 31 or 32. The paper discharge tray 36 is located on the upper surface of the device body 41 in such a manner that it can be opened or closed as required. FIG. 2a shows the paper discharge tray 36 in an open state, whereas FIG. 2b shows the paper discharge tray 36 in a closed state.

Figure 3:
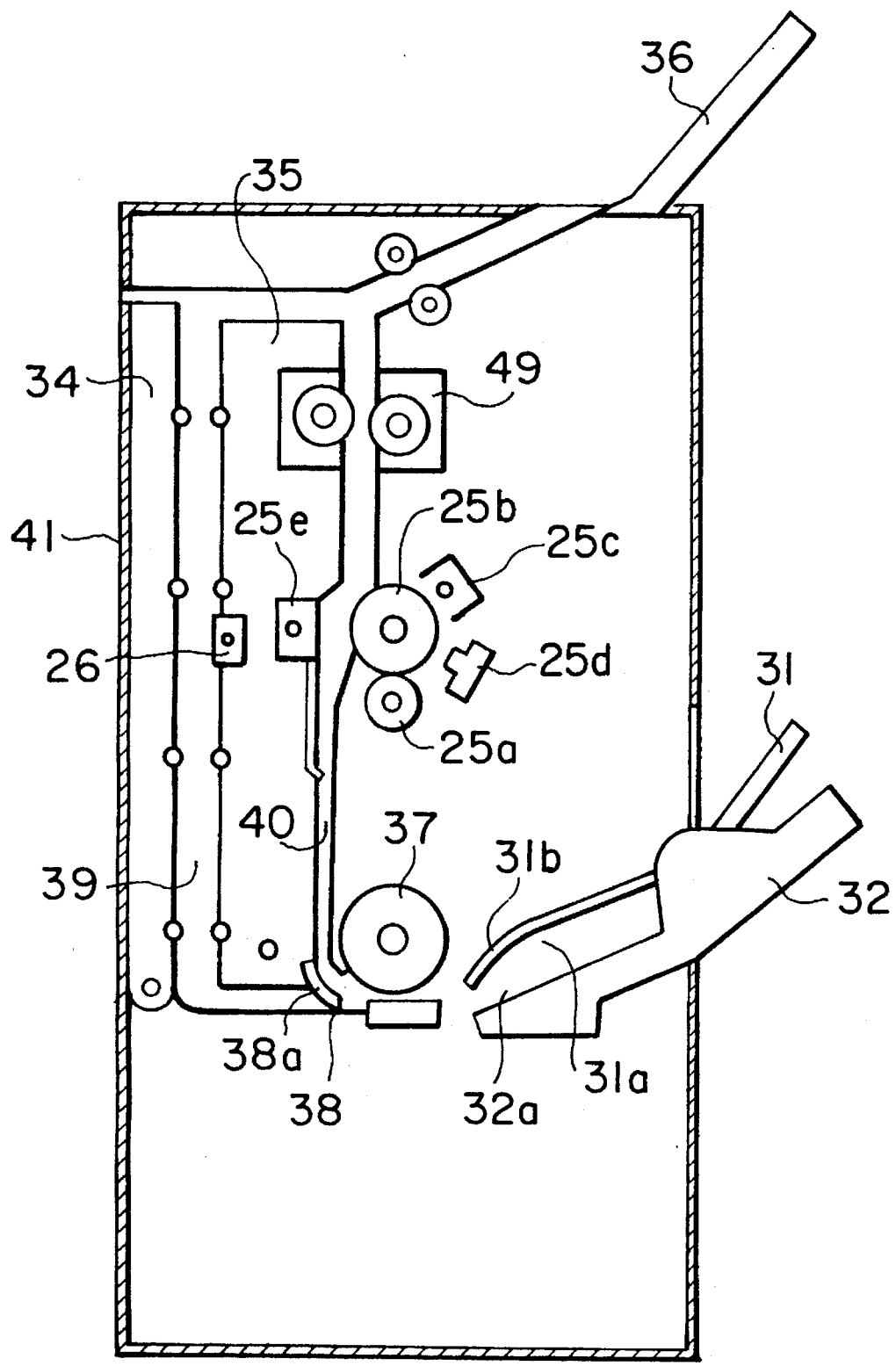
FIG. 3 is a cross-sectional view of the multifunction printer shown in FIG. 1.
Figure 4:
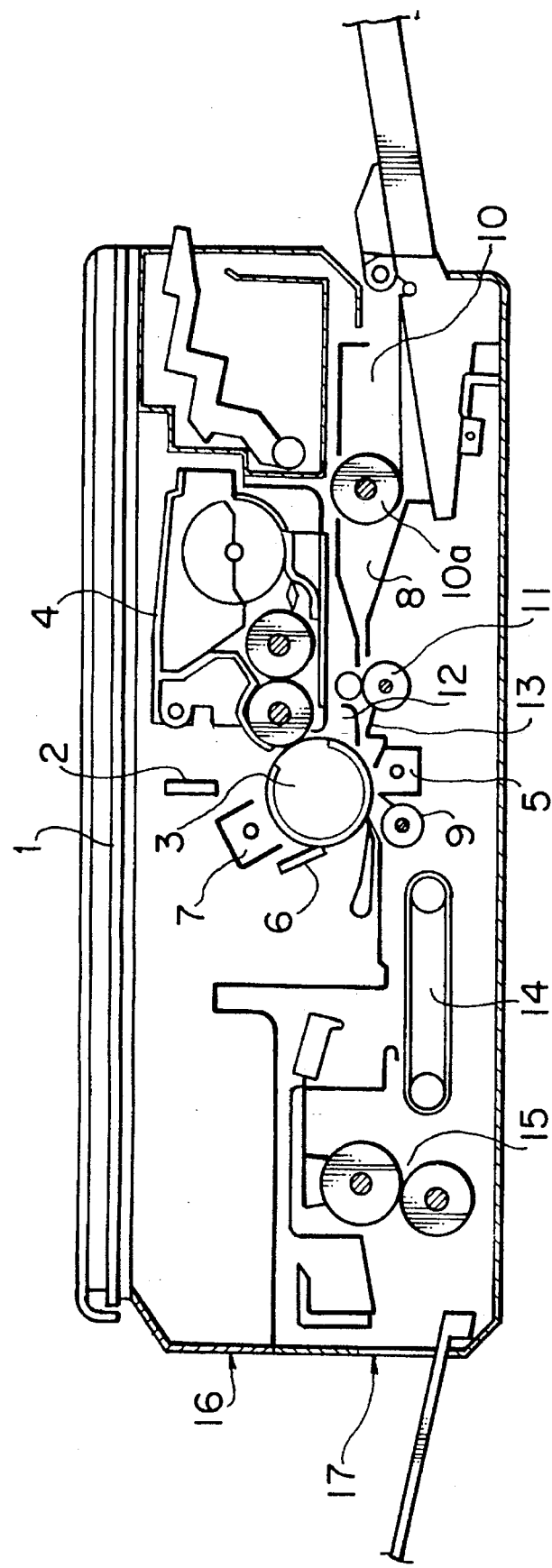
FIG. 4 is a schematic view illustrating the internal structure of a conventional copying machine in a closed condition.
Figure 5:
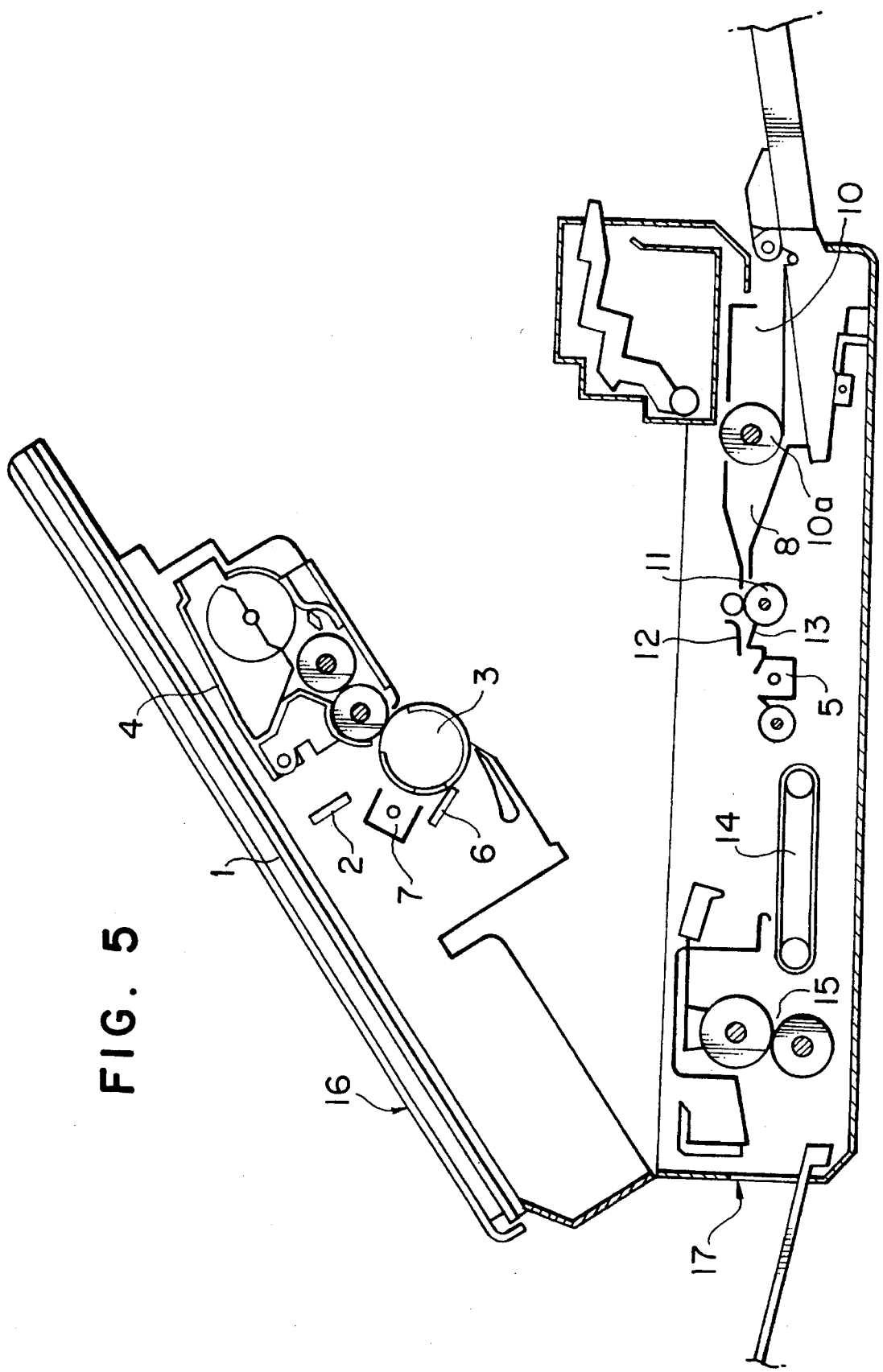
FIG. 5 is a schematic view illustrating the internal structure of the conventional copying machine in an open condition.

FIG. 3 is a cross-sectional view which shows the multifunction printer in the embodiment of the present invention. The first paper tray 31 has a paper inlet 31a, and the second paper tray 32 has a paper inlet 32a. A paper feeding roller 37 feeds paper from the first or second paper tray 31 or 32 into the device body 41. A stack of paper on the first or second paper tray 31 or 32 is fed into the device body 41 sheet by sheet.

A paper guide 31b gently slopes from the paper inlet 31a to a position in the vicinity of the pickup position of the paper feeding roller 37. Paper on the first paper tray 31 is transferred along the paper guide 31b to the pickup position of the paper feeding roller 37. In this condition, the paper fed from the first paper tray 31 is located at a position higher than the topmost paper in the stack on the second paper tray 32, and accordingly, the paper from the first paper tray 31 is fed by the paper feeding roller 37 into the device body 41, prior to the paper stacked on the second paper tray 32.

Diverging means 38 by which one of the first paper transfer path 39 and the second paper transfer path 40 is selected, rotates about an axis 38a under the control of the controller 22 so that paper may be properly guided through either the first paper transfer path 39 or the second paper transfer path 40, depending on whether the paper comes from the first paper tray 31 or the second paper tray 32. The paper fed out from the first or second paper transfer paths 39 or 40 is stacked on the common paper discharge tray 36.

The printing section 25 is located in the second paper transfer path 40, for printing paper. In this embodiment, the printing section 25 has electrophotographic printing means, including a developing part 25a, an OPC drum 25b, a charger 25c, exposure means 25d for exposing the outer surface of the OPC drum 25b in accordance with character data, and an image transferring part 25e for transferring a latent image formed on the OPC drum 25b onto paper fed via the second paper transfer path 40. The paper on which the image has been transferred is fed to a fixing part 49 at which the image is fixed by means of heating. The paper is then fed out onto the paper discharge tray 36.

The image reader 23 is located in the first paper transfer path 39 so that data such as character data may be read from a document. In this embodiment, the image reader has an image sensor of the contact type.

Whereas, in the embodiment described above, the image reader 23 is located in the first paper transfer path 39, and the printing section 25 is located in the second paper transfer path 40, the locations of these elements may be exchanged to each other.

In the multifunction printer constructed in the above-described manner according to the present invention, if jamming occurs in the first paper transfer path 39, jamming paper can be easily removed by opening the first cover 34 so that the first paper transfer path 39 is exposed to the outside. In the case where jamming occurs in the second paper transfer path 40, jamming paper can be easily removed by opening the second cover 35 after opening the first cover 34 so that the second paper transfer path 40 is exposed to the outside.

In the present invention, as described above, the first and second covers are located on one side of the device body in which the first and second paper transfer paths are defined by the first and second covers, respectively, and functional elements such as printing means and image reading means are located in the first and second paper transfer paths. This structure according to the invention not only allows a reduction in the overall size but also allows a user to easily remove jamming paper from either of the first and second paper transfer paths.

What is claimed is:

1. A multifunction printer comprising:

a device body having first and second opposite sides;

a first cover journalled at its one end to said device body on said first side so as to be rotatable, and adapted to be opened and closed; and a second cover located in said device body, inside of said first cover, journalled at its one end to said device body so as to be rotatable, and adapted to be opened and closed;

a first paper transfer path defined in said device body between said first cover and said second cover; and a second paper transfer path defined in said device body inside of said second cover.

2. A multifunction printer according to claim 1, further comprising:

reading means located in said first paper transfer path, for reading text data from a document; and printing means located in said second paper transfer path, for printing data on the paper.

3. A multifunction printer according to claim 1, further comprising:

printing means located in said first paper transfer path, for printing data on paper; and reading means located in said second paper transfer path, for reading text data from a document.

\* \* \* \* \*